(12) United States Patent
Smoot et al.

(10) Patent No.: US 7,764,229 B2
(45) Date of Patent: Jul. 27, 2010

(54) STEERABLE DIRECTIONAL ANTENNA SYSTEM FOR AUTONOMOUS AIR VEHICLE COMMUNICATION

(75) Inventors: Brad Smoot, Scandia Park, NM (US); Erik Erben, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 190 days.

(21) Appl. No.: 12/132,474

(22) Filed: Jun. 3, 2008

(65) Prior Publication Data
US 2009/0295635 A1    Dec. 3, 2009

(51) Int. Cl.
*H01Q 3/00*    (2006.01)
*G01S 13/00*    (2006.01)
(52) U.S. Cl. ...................... 342/359; 342/175
(58) Field of Classification Search ............. 342/175, 342/359
See application file for complete search history.

(56) References Cited

U.S. PATENT DOCUMENTS

| | | | |
|---|---|---|---|
| 3,500,406 | A | 3/1970 | Parker |
| 5,841,397 | A | 11/1998 | Hopkins |
| 6,542,117 | B1 | 4/2003 | Broughton |
| 6,611,696 | B2 | 8/2003 | Chedester et al. |
| 7,181,160 | B2 | 2/2007 | Barrett |
| 2004/0033817 | A1 | 2/2004 | Gorsuch et al. |
| 2004/0102157 | A1 | 5/2004 | Lewis |
| 2004/0147287 | A1 | 7/2004 | Nelson et al. |
| 2004/0198401 | A1 | 10/2004 | Rodgers et al. |
| 2006/0074557 | A1 | 4/2006 | Mulligan et al. |
| 2006/0284775 | A1 | 12/2006 | Kaplan et al. |
| 2007/0057845 | A1 | 3/2007 | Miura |

(Continued)

FOREIGN PATENT DOCUMENTS

WO    0103438    1/2001

OTHER PUBLICATIONS

Karmakar et al., "Electronically Steerable Array Antennas for Mobile Satellite Communications-A Review", "2000 IEEE International Conference on Phased Array Systems and Technology", May 21-25, 2000, pp. 81-84, Publisher: IEEE.

(Continued)

*Primary Examiner*—Khoi Tran
*Assistant Examiner*—Harry Liu
(74) *Attorney, Agent, or Firm*—Fogg & Powers LLC (57) ABSTRACT

A system and method for communication with an autonomous air vehicle are provided. The system comprises a steerable antenna array including a plurality of directional antenna elements each selectable to receive a video signal from the air vehicle. An antenna control unit is operatively coupled to the antenna elements and includes a magnetometer for determining an orientation for each of the antenna elements. A ground control station is in operative communication with the antenna array and comprises a ground data terminal in operative communication with the antenna control unit, and an operator control unit in operative communication with the data terminal and the antenna control unit. The operator control unit is configured to obtain positions of the air vehicle and the ground control station from the data terminal. The operator control unit is further configured to determine which of the antenna elements to select by utilizing the positions of the air vehicle and the ground control station, and the orientation of one of the antenna elements.

20 Claims, 5 Drawing Sheets

U.S. PATENT DOCUMENTS

2009/0125163 A1* 5/2009 Duggan et al. .................. 701/2

OTHER PUBLICATIONS

Navda et al., "Mobisteer: Using Steerable Beam Directional Antenna for Vehicular Network Access", "MOBISYS '07", Jun. 11-14, 2007, pp. 1-14, Publisher: ACM, Published in: San Juan, PR USA.

Sodano et al, "Direct and Inverse Solutions of GEODESICS", "Army Map Service", Jul. 1963, Publisher: US Army, Published in: US.

Xu et al., "Report on Steerable Antenna Architectures and Critical RF Circuits Performance", "Capanina Consortium Report No. CAP-D24-WP32-UOY-PUB-01", Nov. 29, 2006, pp. 14-31, 60-71, Publisher: Capanina.

European Patent Office, "European Search Report", Oct. 26, 2009, Published in: EP.

* cited by examiner

STEERABLE DIRECTIONAL ANTENNA SYSTEM FOR AUTONOMOUS AIR VEHICLE COMMUNICATION

GOVERNMENT LICENSE RIGHTS

The U.S. Government may have certain rights in the present invention as provided for by the terms of Contract No. W56HZV-05-C-0724 with the U.S. Army.

BACKGROUND

Unmanned aerial vehicles (UAVs) are remotely piloted or self-piloted aircraft that can carry cameras, sensors, communications equipment, or other payloads. A newer class of UAVs known as Micro Air Vehicles (MAVs) are essentially flying video camera systems that send video signals from the MAV to a ground control station (GCS). The video signal is less than 2 Watts in an L-band frequency (1-2 GHz) regime and needs to meet a 10 km line of sight (LOS) range requirement. Mounting an antenna on a moving vehicle and attempting to track to a moving MAV presents unique problems.

Earlier attempts to develop a di-pole omni-directional antenna have been unsuccessful at meeting or exceeding video communication range requirements for MAV systems. In order to meet the range requirements, a high gain directional logarithmic antenna was developed that gave the GCS a greater than 7.5 dBi gain and gave a greater than 10 km LOS capability to the MAV system. However, the directionality of this antenna required the operator to continually reposition the antenna for best reception of the video. This is easily accomplished in a dismounted operation where the operator can simply turn the GCS mounted antenna in the direction of the MAV, but when the operator is mounted and moving in a vehicle, adjusting the direction of the antenna is cumbersome at best. Additionally the movement of the vehicle can quickly change the direction of a fixed directional antenna mounted to the vehicle which results in a total loss of the video signal from the MAV.

Accordingly, the use of L-band frequencies and the uniqueness of the MAV/GCS geometry has made it difficult to find a commercially viable solution for meeting MAV system communication range requirements.

SUMMARY

The present invention is related to a system and method for communication with an autonomous air vehicle. The system comprises a steerable antenna array including a plurality of directional antenna elements each selectable to receive a video signal from the autonomous air vehicle. An antenna control unit is operatively coupled to the directional antenna elements. The antenna control unit includes a magnetometer for determining an orientation for each of the directional antenna elements. A ground control station is in operative communication with the steerable antenna array. The ground control station comprises a ground data terminal in operative communication with the antenna control unit for receiving the video signal, and an operator control unit in operative communication with the ground data terminal and the antenna control unit. The operator control unit is configured to obtain a position of the autonomous air vehicle and a position of the ground control station from the ground data terminal. The operator control unit is further configured to determine which of the directional antenna elements to select by utilizing the position of the autonomous air vehicle, the position of the ground control station, and the orientation of one of the directional antenna elements. The steerable antenna array is configured for automatic selection and manual selection of one or more of the directional antenna elements.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a steerable directional antenna system and method for autonomous air vehicle communication. The directional antenna system is implemented with a steerable antenna array, and a ground control station in operative communication with the antenna array. The directional antenna system supports an automatic mode in which a controller chooses an antenna element in the antenna array with the highest signal reception strength. The directional antenna system also supports a manual mode in which an operator manually selects the antenna element with the best signal reception strength.

The antenna elements of the antenna array can be positioned at an angle with respect to each other from about 45 degrees to about 90 degrees. In one embodiment, the antenna array comprises at least four antenna elements. In another embodiment, the antenna array comprises at least eight antenna elements. Other numbers of antenna elements such five elements, six elements, etc. can be employed in other embodiments as long as there is a 360 degree signal coverage between all of the antenna elements.

The present directional antenna system can be ruggedized for mounting on a mobile ground vehicle, such as an armored command vehicle. The directional antenna system can be implemented to support a frequency set compatible with one or more unmanned aerial vehicles (UAVs) such as a micro air vehicle (MAV) system.

The system and method of the present invention are described in further detail hereafter with respect to the drawings.

Figure 1:
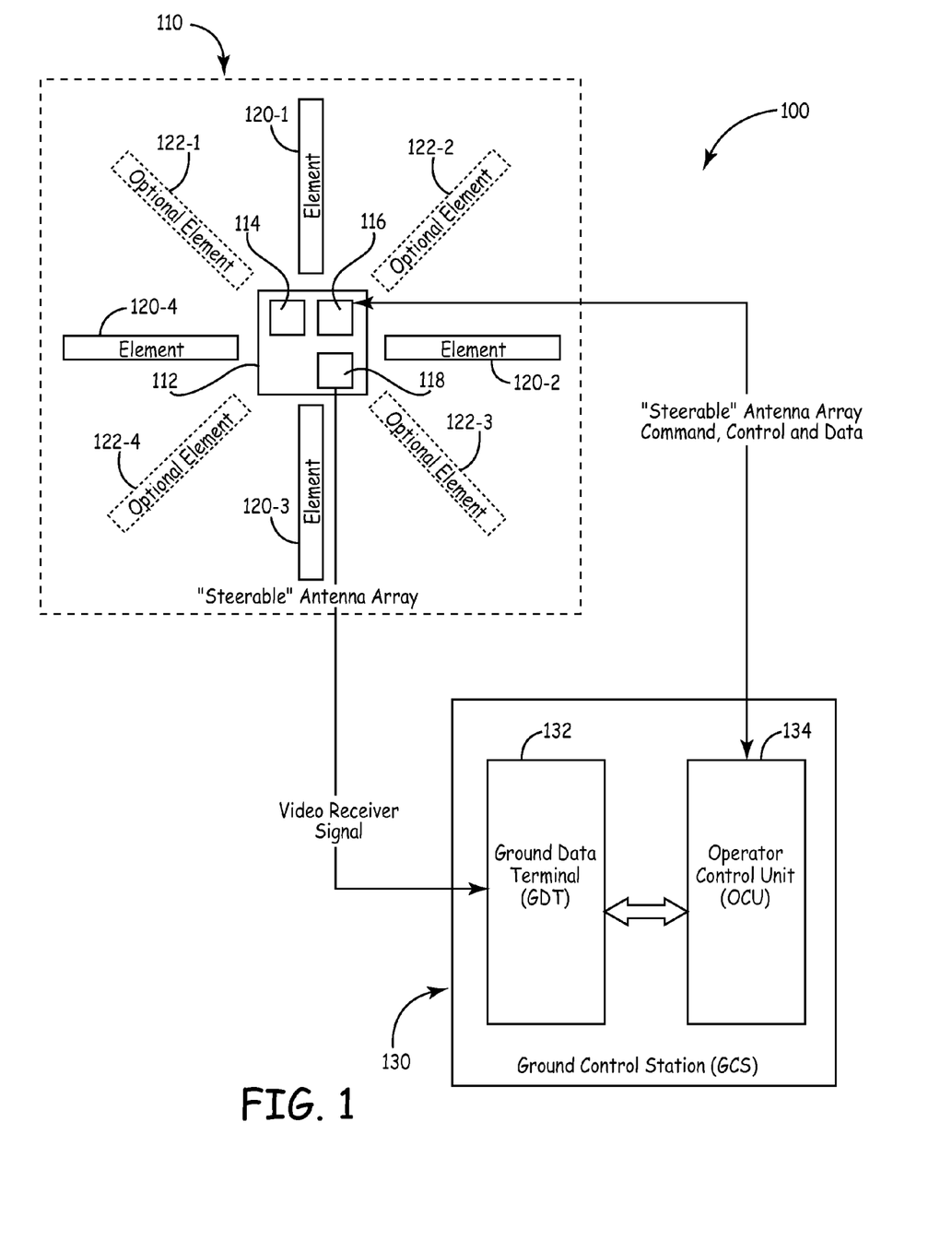
FIG. 1 is a block diagram of a steerable directional antenna system according to one embodiment of the invention.

FIG. 1 is a block diagram of a steerable directional antenna system 100 according to one embodiment of the present invention. The steerable directional antenna system 100 generally includes a steerable antenna array 110, and a ground control station (GCS) 130 in operative communication with antenna array 110.

The antenna array 110 includes an antenna control unit 112 comprising a magnetometer 114, an antenna controller 116, and a radio frequency (RF) switch 118. The antenna array 110 also includes a plurality of directional antenna elements 120-1, 120-2, 120-3, and 120-4 that are adjacent to control unit 112. In one embodiment, the antenna elements 120-1 to 120-4 are positioned at about a 90 degree angle with respect to each other in antenna array 110.

In one implementation, the antenna array 110 includes high-gain logarithmic antenna elements that can be automatically or manually switched to provide the best reception possible for a given air vehicle/ground control station position. The antenna elements are controllable with a monitor circuit or software.

The antenna array 110 can also include a plurality of optional directional antenna elements 122-1, 122-2, 122-3, and 122-4. In one embodiment, each of antenna elements 122-1 to 122-4 are positioned in between adjacent antenna elements 120-1 to 120-4 so that antenna elements 122-1 to 122-4 are at about a 90 degree angle with respect to each other in antenna array 110. In this embodiment, each of the antenna elements is positioned at about a 45 degree angle with respect to adjacent antenna elements as shown in FIG. 1.

The ground control station 130 includes a ground data terminal 132 and an operator control unit 134 that operatively communicate with each other. The ground data terminal 132 is configured to receive a video receiver signal from the RF switch 118 in antenna array 110. The operator control unit 134 is in operative communication with antenna controller 116 to transmit and receive antenna array command, control, and data signals.

The antenna controller 116 can also implement software or firmware to support a communication protocol for communicating with ground control station 130 to receive or transmit data. For example, the antenna controller can receive commands from operation control unit 134 to automatically switch to the best positioned element, or to manually switch to a specific antenna. The antenna controller 116 can transmit data to operation control unit 134, with such data including the signal strength of each element in the antenna array, the identity (ID) of a currently selected antenna element, the current operation mode of manual or automatic, battery strength (if applicable), and scanning frequency (if applicable)

During operation, the directional antenna system 100 utilizes magnetometer 114 to determine the orientation of one of the antenna elements. After obtaining the position of ground control station 130 using a global positioning system (GPS) device and the position of an air vehicle from command and control data, the operator control unit 134 calculates direction and distance of the air vehicle, and determines the most appropriate antenna element to be selected to achieve the best reception of an air vehicle video signal. The operator control unit 134 then transmits instructions to antenna controller 116 to switch to the selected antenna element. Video signals from the selected antenna element are fed to a video receiver in ground data terminal 132 for use by the operator. The operator may also manually switch to any antenna element by using a graphical user interface, which is described in further detail hereafter.

Figure 2:
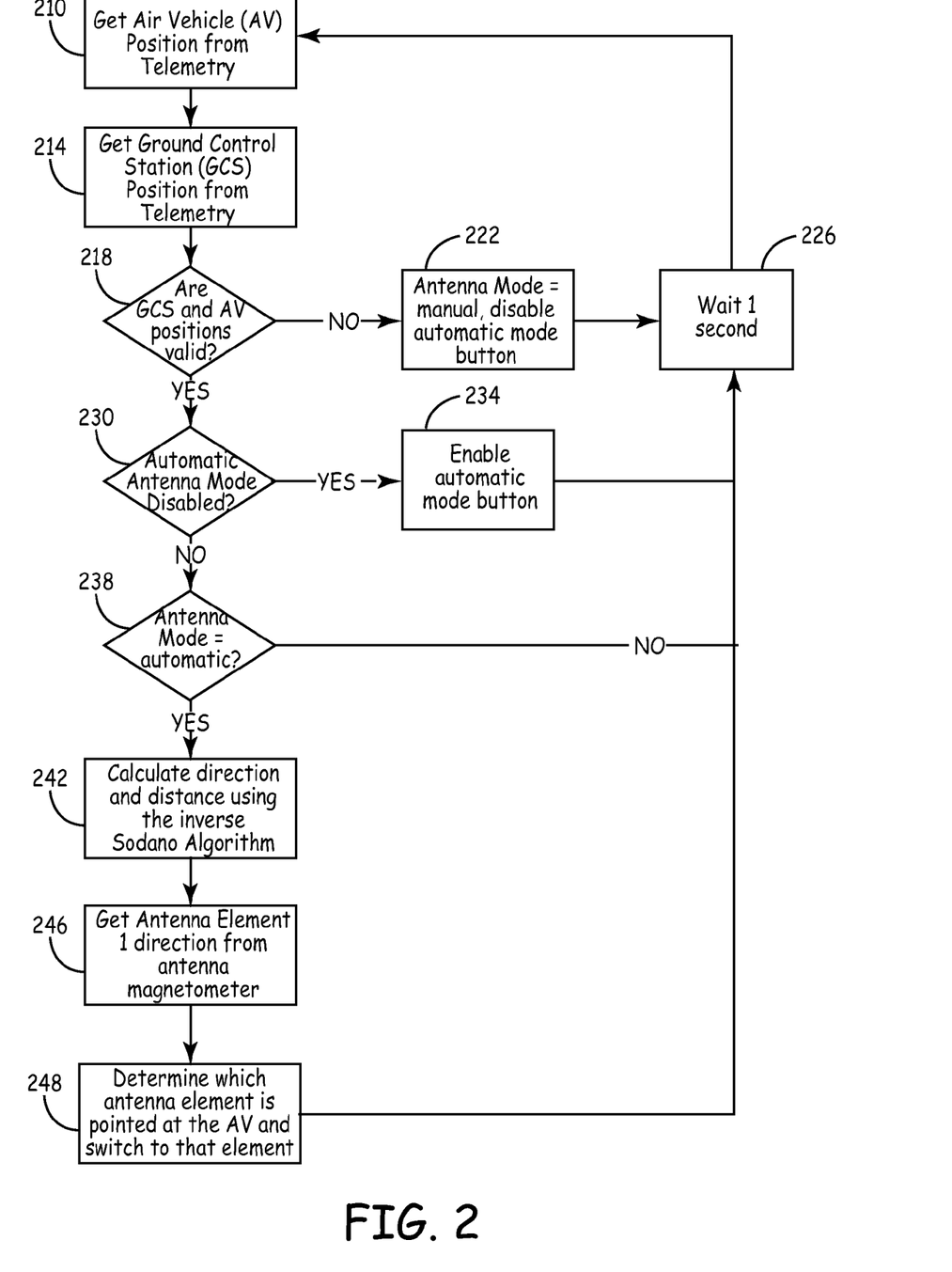
FIG. 2 is a functional process flow diagram for a method of operating a steerable antenna array according to one embodiment of the invention.

FIG. 2 is a functional process flow diagram for a method of operating the steerable directional antenna system of the invention, such as antenna system 100 of FIG. 1, for autonomous air vehicle communication. The method can be implemented in software located in an operator control unit of a ground control station such as GCS 130 in FIG. 1. As depicted in FIG. 2, initially an air vehicle (AV) position is obtained from telemetry data (block 210). Next, a ground control station position is obtained from telemetry data (block 214). A determination is then made whether the ground control station and air vehicle positions are valid (block 218). If not, the antenna mode is set to manual, and the automatic mode input such as a button is disabled (block 222). After, a preset time period (e.g., 1 sec.) (block 226), the process returns to block 210 and the above process steps are repeated.

If the ground control station and air vehicle positions are valid (yes, after block 218), then a determination is made whether the automatic antenna mode is disabled (block 230). If yes, then the automatic mode input (button) is enabled (block 234), the process returns to block 226, and then back to block 210 to repeat the above process steps. If the automatic antenna mode is not disabled (no, after block 230), then a determination is made whether the antenna mode is in automatic (block 238). If not, the process returns to block 226, and then back to block 210 to repeat the above process steps. If the antenna mode is in automatic (yes, after block 238), the direction and distance of the air vehicle are calculated (block 242), such as by using an inverse Sodano algorithm. See Sodano et al., *Direct and Inverse Solutions of Geodesics*, Army Map Service, Technical Report No. 7 (Rev.), pp. 1-42 (July 1963), which is incorporated herein by reference.

Thereafter, a first antenna element direction is obtained from the antenna array magnetometer (block 246). A determination is then made as to which antenna element is pointed at the air vehicle and the antenna array is switched to that antenna element (block 248). The process then returns to block 226 and back to block 210. The above process steps are continually repeated during operation of the antenna system.

Figure 3:
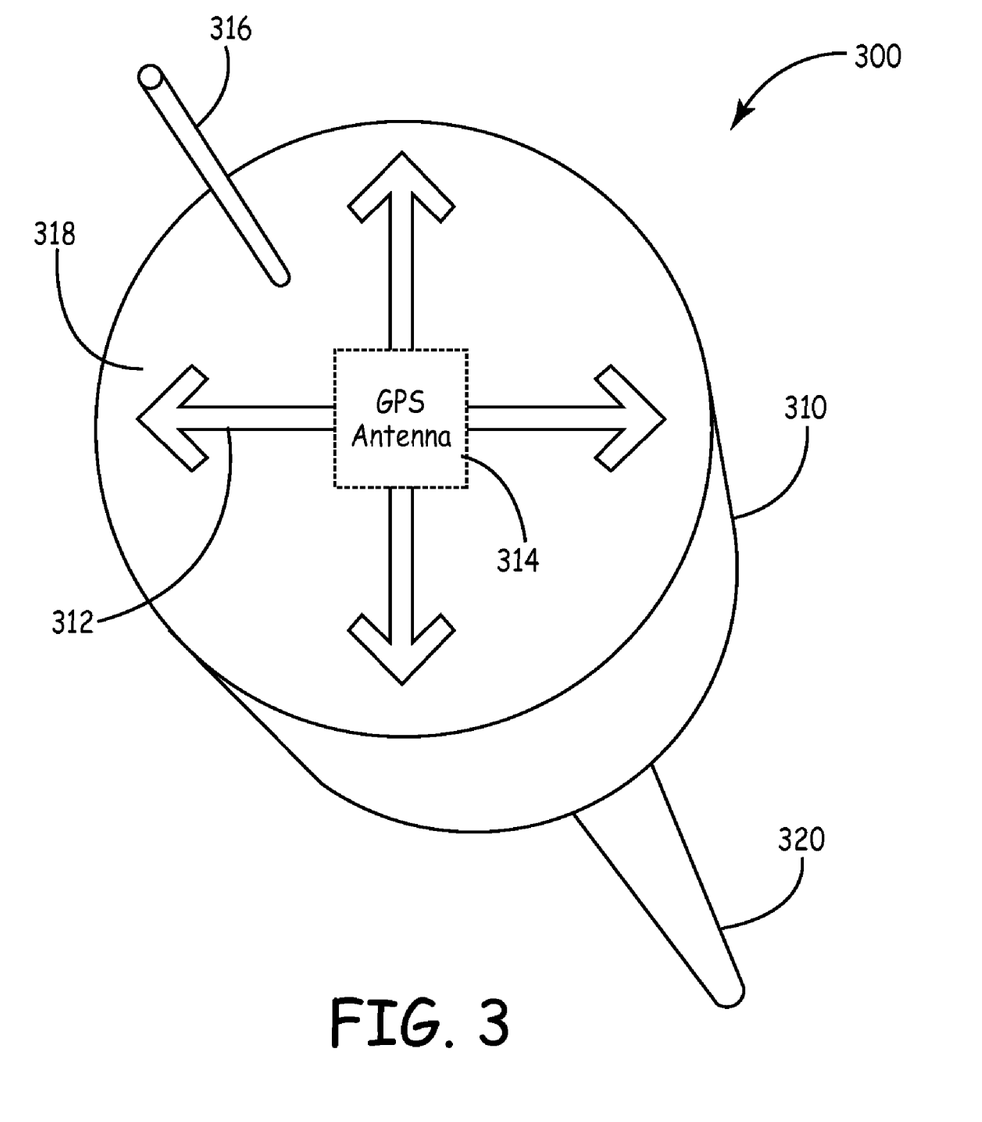
FIG. 3 is a schematic perspective view of a steerable antenna array device according to one embodiment of the invention.

FIG. 3 is a schematic perspective view of a steerable antenna array device 300 according to one embodiment. The antenna array device 300 includes an antenna housing 310 that contains an antenna array 312 and provides environmental protection for antenna array 312. The antenna array 312 has 4 to 8 antenna elements arranged at about 90 degrees to about 45 degrees apart. A GPS antenna 314 is operatively coupled to antenna housing 310. A command and control antenna 316 is operatively coupled to an antenna controller for the antenna array 312 through an upper surface 318 of antenna housing 310. A mast and cables package 320 is operatively coupled to antenna array 312 through a lower surface of antenna housing 310.

Figure 4:
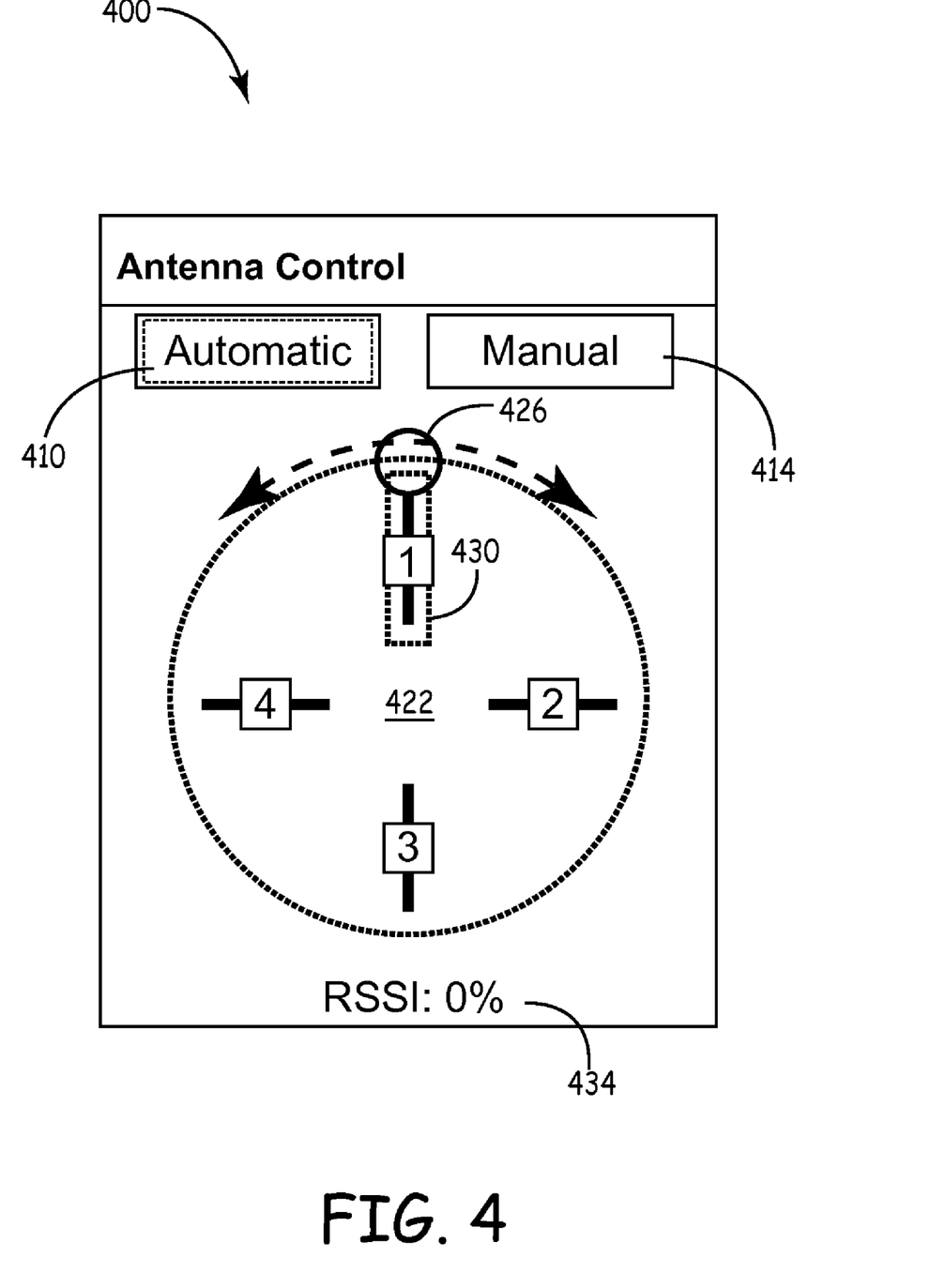
FIG. 4 is a schematic view of a steerable antenna control graphical user interface according to one embodiment of the invention.

FIG. 4 is a schematic view of a steerable antenna control graphical user interface 400 according to one embodiment. The graphical user interface 400 can be implemented as a window on a video monitor screen that shows a video feed from an air vehicle to an operator in a ground control station. The video monitor screen can be implemented with a touch screen to allow direct input control of graphical user interface 400 by the operator. The graphical user interface 400 includes an automatic mode selector button 410, and a manual mode selector button 414. A steerable antenna array visual indicator 422 represents a corresponding antenna array such as antenna array 110 in FIG. 1. The antenna array visual indicator 422 includes antenna element icons 1, 2, 3 and 4, which represent antenna elements such as antenna elements 120-1, 120-2, 120-3, and 120-4 in FIG. 1.

An air vehicle (AV) position visual indicator 426 is automatically positionable around antenna array depiction 422 to show the switching to the antenna element that has the strongest signal connection with the air vehicle. For Example, FIG.

4 shows AV position visual indicator 426 adjacent to antenna element icon 1, indicating that the corresponding antenna element is selected for having the strongest signal connection with the air vehicle. An antenna element selection visual indicator 430 surrounds an antenna element icon to indicate which antenna element is currently selected. For Example, FIG. 4 shows visual indicator 430 surrounding antenna element icon 1, indicating that the corresponding antenna element is currently selected. A received signal strength visual indicator (RSSI) 434 is displayed below antenna array depiction 422. The RSSI 434 displays the current selected element signal strength.

During manual mode operation, the antenna element icons of graphical user interface 400 can be touched to manually select a particular antenna element. During automatic mode operation, a user cannot interact with graphical user interface 400 to change a selected antenna element.

Figure 5:
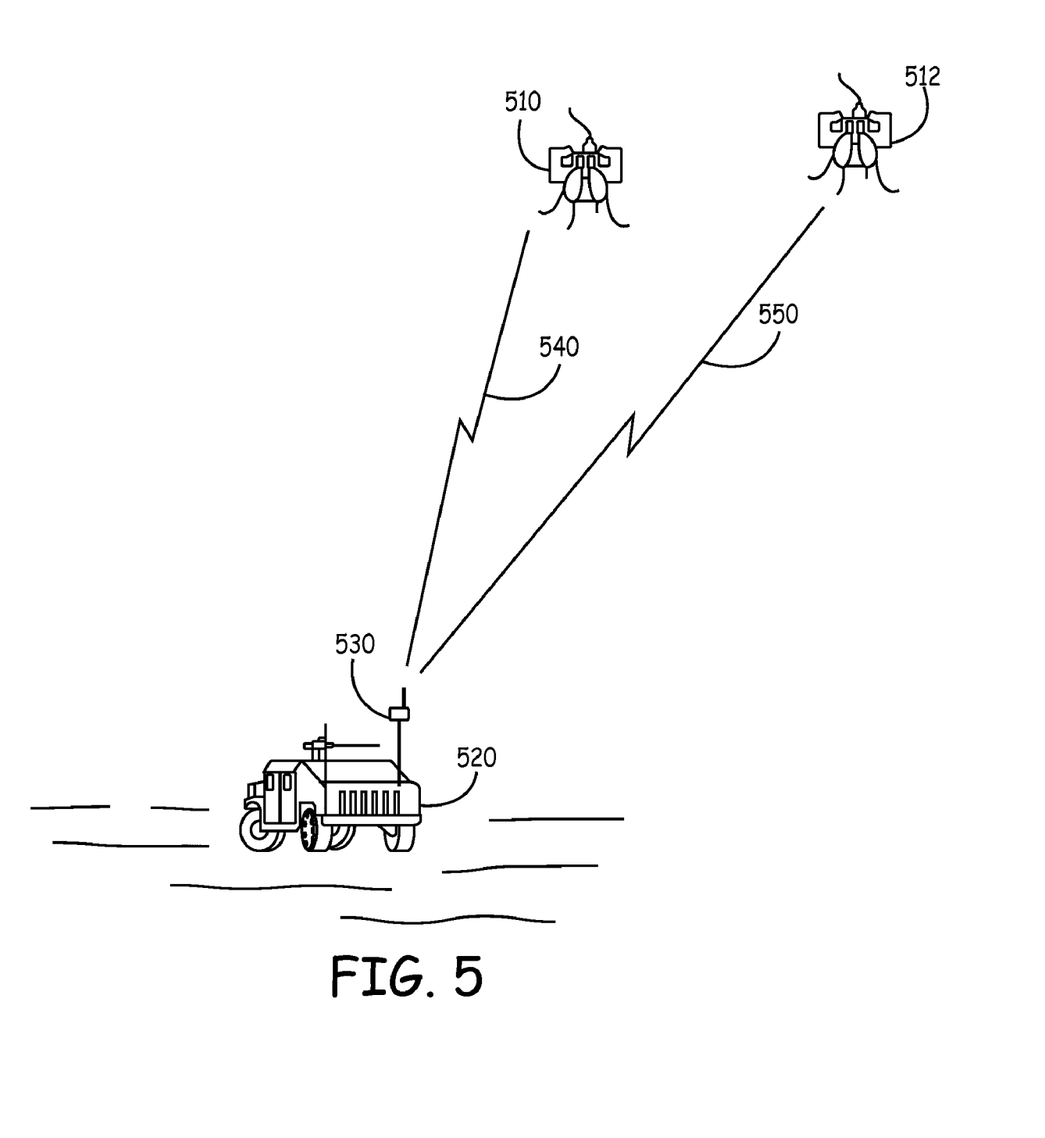
FIG. 5 is a schematic diagram of an exemplary field use of the steerable directional antenna system according to the present invention.

FIG. 5 is a schematic diagram of an exemplary field use of a steerable directional antenna system according to the present invention, such as in a military operation. Various assets are deployed in the field, including a plurality of UAVs such as MAVs 510 and 512. It should be understood that one or more than two UAVs can be used with the present system. The directional antenna system such as described previously is implemented in a command motor vehicle 520, which includes an antenna array device 530. A ground control station is located inside of motor vehicle 520 and is operatively connected to antenna array device 530.

During operation, communication links 540 and 550 are established with each of MAVs 510 and 512, respectively. As one or more of the MAVs change position relative to motor vehicle 520, the directional antenna system is operated manually or automatically as described above to obtain the best video signal from the MAVs.

Instructions for carrying out the various process tasks, calculations, and generation of signals and other data used in the operation of the system and method of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented by computer executable instructions, such as program modules, which are executed by a processor. Generally, program modules include routines, programs, objects, data components, data structures, algorithms, etc. that perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for communication with an autonomous air vehicle, the system comprising:
    a steerable antenna array, comprising:
        a plurality of directional antenna elements each selectable to receive a video signal from the autonomous air vehicle; and
        an antenna control unit operatively coupled to the directional antenna elements, the antenna control unit including a magnetometer for determining an orientation for each of the directional antenna elements;
    a ground control station in operative communication with the steerable antenna array, the ground control station comprising:
        a ground data terminal in operative communication with the antenna control unit for receiving the video signal; and
        an operator control unit in operative communication with the ground data terminal and the antenna control unit, the operator control unit configured to obtain a position of the autonomous air vehicle and a position of the ground control station from the ground data terminal, the operator control unit further configured to determine which of the directional antenna elements to select by utilizing the position of the autonomous air vehicle, the position of the ground control station, and the orientation of one of the directional antenna elements;
    wherein the steerable antenna array is configured for automatic selection and manual selection of one or more of the directional antenna elements.

2. The system of claim 1, wherein the control unit includes an antenna controller, and a radio frequency (RF) switch.

3. The system of claim 2, wherein the ground data terminal is configured to receive the video signal from the RF switch.

4. The system of claim 2, wherein the operator control unit is in operative communication with the antenna controller to transmit and receive command signals, control signals, and data signals.

5. The system of claim 1, wherein the directional antenna elements are positioned at an angle with respect to each other from about 45 degrees to about 90 degrees.

6. The system of claim 1, wherein the steerable antenna array comprises at least four directional antenna elements.

7. The system of claim 1, wherein the steerable antenna array comprises at least eight directional antenna elements.

8. The system of claim 1, wherein the steerable antenna array is disposed in an antenna housing that provides environmental protection to the steerable antenna array.

9. The system of claim 8, further comprising a global positioning system antenna operatively coupled to the antenna housing.

10. The system of claim 8, further comprising a command and control antenna operatively coupled to the antenna housing.

11. A method for communication with an autonomous air vehicle, the method comprising:
   (a) obtaining a position for a ground control station from telemetry data;
   (b) obtaining a position for the autonomous air vehicle from telemetry data;
   (c) determining whether the positions of a ground control station and the autonomous air vehicle are valid;
   (d) setting an antenna mode to manual and disabling an automatic antenna mode input for a steerable antenna array when the positions of the ground control station and autonomous air vehicle are not valid, and repeating steps (a) to (c) after a preset time period;
   (e) determining whether the automatic antenna mode is disabled when the positions of the ground control station and autonomous air vehicle are valid;
   (f) enabling the automatic antenna mode input when the automatic mode is disabled, and repeating steps (a) to (e) after the preset time period;
   (g) when the automatic antenna mode is not disabled, determining whether an antenna mode is set to automatic;
   (h) when the antenna mode is not set to automatic, repeating steps (a) to (g) after the preset time period;
   (i) when the antenna mode is set to automatic, calculating a direction and distance to the autonomous air vehicle;
   (j) obtaining direction data for a first antenna element of the steerable antenna array;
   (k) determining whether the first antenna element or another antenna element is pointed at the autonomous air vehicle; and
   (l) switching the antenna array to the antenna element that is pointed at the autonomous air vehicle.

12. The method of claim 11, wherein the autonomous air vehicle is a micro air vehicle.

13. The method of claim 11, wherein the ground control station and steerable antenna array are implemented in a mobile ground vehicle.

14. The method of claim 11, wherein the direction and distance to the autonomous air vehicle is calculated using an inverse Sodano algorithm.

15. The method of claim 11, wherein the direction data for the first antenna element is obtained from an antenna array magnetometer.

16. A computer program product, comprising:
   a computer readable medium having instructions stored thereon for a method of communication with an autonomous air vehicle according to claim 11.

17. The computer program product of claim 16, wherein the computer readable medium has further instructions for generating a graphical user interface on a touch screen display.

18. The computer program product of claim 17, wherein the graphical user interface comprises:
   an automatic mode selector button;
   a manual mode selector button;
   a steerable antenna array visual indicator including antenna element icons;
   an air vehicle position visual indicator;
   an antenna element selection visual indicator; and
   a received signal strength visual indicator.

19. A computer comprising:
   a computer readable medium having instructions stored thereon for a method of communication with an autonomous air vehicle according to claim 11.

20. The computer of claim 19, wherein the computer readable medium has further instructions for generating a graphical user interface on a touch screen display, the graphical user interface comprising:
   an automatic mode selector button;
   a manual mode selector button;
   a steerable antenna array visual indicator including antenna element icons;
   an air vehicle position visual indicator;
   an antenna element selection visual indicator; and
   a received signal strength visual indicator.

* * * * *